United States Patent
Guo et al.

(10) Patent No.: US 11,203,141 B1
(45) Date of Patent: Dec. 21, 2021

(54) SINGLE-CAVITY MULTI-RUNNER APPLIED TO ORIENTED ARRANGEMENT EXTRUSION MOLDING EQUIPMENT OF GRAPHENE FIBERS

(71) Applicants: Suzhou Kanronics Electronic Technology CO., LTD., Suzhou (CN); Shenzhen HanHua TM Technology Co., LTD., Shenzhen (CN)

(72) Inventors: Mars Guo, Nanyang (CN); Daniel Huang, Shenzhen (CN); Wenbin Chen, Nanxiong (CN); William Yang, Heze (CN)

(73) Assignees: Suzhou Kanronics Electronic Technology CO., LTD., Suzhou (CN); Shenzhen HanHua TM Technology Co., LTD., Shenzhen (CN)

( * ) Notice: Subject to any disclaimer, the term of this patent is extended or adjusted under 35 U.S.C. 154(b) by 0 days.

(21) Appl. No.: 17/047,701

(22) PCT Filed: Mar. 10, 2020

(86) PCT No.: PCT/CN2020/078636
§ 371 (c)(1),
(2) Date: Oct. 15, 2020

(87) PCT Pub. No.: WO2021/098087
PCT Pub. Date: May 27, 2021

(30) Foreign Application Priority Data

Nov. 18, 2019 (CN) .......................... 201911129177.0

(51) Int. Cl.
*B29C 48/50* (2019.01)
*B29C 48/475* (2019.01)
(Continued)

(52) U.S. Cl.
CPC ............ *B29C 48/50* (2019.02); *B29C 48/022* (2019.02); *B29C 48/255* (2019.02);
(Continued)

(58) Field of Classification Search
CPC ..... B29C 48/251; B29C 48/475; B29C 48/48; B29C 48/485; B29C 48/695; B29C 48/70;
(Continued)

(56) References Cited

U.S. PATENT DOCUMENTS 6,910,277 B2 * 6/2005 Proulx .................. B29C 48/131
30/276
9,034,239 B2 * 5/2015 Yun ...................... D01D 5/0038
264/465
(Continued)

FOREIGN PATENT DOCUMENTS

| CN | 101746039 A | 6/2010 |
|---|---|---|
| CN | 102632095 A | 8/2012 |
| JP | 2018192685 A | 12/2018 |

*Primary Examiner* — Benjamin A Schiffman
(74) *Attorney, Agent, or Firm* — Bayramoglu Law Offices LLC

(57) ABSTRACT

A single-cavity multi-runner applied to oriented arrangement extrusion molding equipment of graphene fibers includes a first extrusion cavity, the first extrusion cavity includes a first inlet and a first outlet arranged opposite to each other; a first molding cavity, the first molding cavity is arranged in an inclined manner, a second inlet is arranged at the high position end, a second outlet is arranged at the low position end of the first molding cavity, and the second inlet is connected to the first outlet; flow channels, the flow channels are formed by dividing the first molding cavity using baffle plates arranged horizontally and along the flowing direction of a heat-conducting mixture; a second molding cavity, the second molding cavity includes a third
(Continued)

inlet and a third outlet arranged opposite to each other, the third inlet is connected to the outflow end of the flow channels.

10 Claims, 4 Drawing Sheets

(51) Int. Cl.
*B29C 48/94* (2019.01)
*B29C 48/00* (2019.01)
*B29C 48/255* (2019.01)
*B29C 48/285* (2019.01)
*B29C 48/345* (2019.01)
*B29C 48/07* (2019.01)
*B29K 307/04* (2006.01)
*B29K 105/12* (2006.01)
*B29C 48/70* (2019.01)
*B29C 48/695* (2019.01)
*B29C 70/14* (2006.01)
*B29C 70/62* (2006.01)
*D01D 4/06* (2006.01)

(52) U.S. Cl.
CPC ........ *B29C 48/2886* (2019.02); *B29C 48/345* (2019.02); *B29C 48/475* (2019.02); *B29C 48/94* (2019.02); *B29C 48/07* (2019.02); *B29C 48/695* (2019.02); *B29C 48/70* (2019.02); *B29C 70/14* (2013.01); *B29C 70/62* (2013.01); *B29K 2105/12* (2013.01); *B29K 2307/04* (2013.01); *B29K 2995/0013* (2013.01); *D01D 4/06* (2013.01)

(58) Field of Classification Search
CPC ....... B29C 48/345; B29C 70/62; B29C 70/14; D01D 4/06
USPC ........................................................ 264/108
See application file for complete search history.

(56) References Cited

U.S. PATENT DOCUMENTS

| | | | |
|---|---|---|---|
| 10,137,617 B2* | 11/2018 | Kune | B29C 48/022 |
| 10,829,623 B1* | 11/2020 | Van Citters | C08F 10/02 |
| 11,104,045 B1* | 8/2021 | Guo | B29C 43/04 |
| 11,154,897 B2* | 10/2021 | Moriyasu | B05C 17/00576 |
| 2005/0074993 A1* | 4/2005 | Alam | B29C 48/08 439/91 |
| 2016/0297104 A1* | 10/2016 | Guillemette | B29B 11/16 |
| 2019/0193320 A1* | 6/2019 | Lang | H01B 13/0036 |
| 2020/0031018 A1* | 1/2020 | Sung | B29B 11/10 |
| 2020/0206794 A1* | 7/2020 | Zhou | B21C 23/002 |
| 2020/0246826 A1* | 8/2020 | Moriyasu | B30B 11/26 |
| 2021/0053283 A1* | 2/2021 | Liu | B29C 64/118 |
| 2021/0060876 A1* | 3/2021 | Lin | B29C 48/475 |

* cited by examiner

SINGLE-CAVITY MULTI-RUNNER APPLIED TO ORIENTED ARRANGEMENT EXTRUSION MOLDING EQUIPMENT OF GRAPHENE FIBERS

CROSS REFERENCE TO THE RELATED APPLICATIONS

This application is the national phase entry of International Application No. PCT/CN2020/078636, filed on Mar. 10, 2020, which is based upon and claims priority to Chinese Patent Application No. 201911129177.0, filed on Nov. 18, 2019, the entire contents of which are incorporated herein by reference.

TECHNICAL FIELD

The present invention relates to the technical field of high thermal conductivity sheet production, and in particular to a single-cavity multi-runner applied to oriented arrangement extrusion molding equipment of graphene fibers.

BACKGROUND

With the rapid development of big data, 5th generation mobile networks (5G), artificial intelligence (AI) and Internet of things, the heat source power of electronic components is increasing. Higher requirements have been placed on the heat transfer efficiency of cross-section heat conduction materials due to the heightened heat dissipation requirements, conventional heat-conducting sheet can no longer meet the requirements of heat-conduction function. Therefore, there is an urgent need for a heat-conducting sheet with higher heat conductivity that meets heat dissipation requirements. Graphene fibers are gradually applied to the production of the heat-conducting sheet due to the excellent heat conductivity.

Researches have shown that when the heat-conducting graphene fibers in the heat-conducting sheet are aligned with the sheet in the same direction, the heat-conducting graphene fibers can achieve good heat-conducting performance in the axial direction or the sheet plane direction. Prior art uses a single cavity for extruding materials in the extrusion molding stage of the heat-conducting sheet, which leads to the unsatisfactory oriented alignment of the heat-conducting graphene fibers and the sheet, and the unsatisfactory heat-conducting performance of the heat-conducting sheet.

SUMMARY

In order to achieve the above objective, the present invention provides a single-cavity multi-runner applied to oriented arrangement extrusion molding equipment of graphene fibers to improve the heat-conducting performance of a heat-conducting sheet, which includes:

a first extrusion cavity, wherein the first extrusion cavity includes a first inlet and a first outlet arranged opposite to each other;

a first molding cavity, wherein the first molding cavity is arranged in an inclined manner, a second inlet is arranged at the high position end of the first molding cavity, a second outlet is arranged at the low position end of the first molding cavity, and the second inlet is connected to the first outlet;

a plurality of flow channels, wherein the plurality of flow channels are formed by dividing the first molding cavity using baffle plates arranged horizontally along the flowing direction of a heat-conducting mixture;

a second molding cavity, wherein the second molding cavity includes a third inlet and a third outlet arranged opposite to each other, the third inlet is connected to the outflow end of the flow channels, and the inner wall of the second molding cavity is contracted gradually from the third inlet to the third outlet.

Preferably, the inner wall of the first extrusion cavity is provided with a first area of rough surface and a first area of smooth surface, and the first area of smooth surface is arranged adjacent to the first inlet.

Preferably, the inner wall of each flow channel is provided with a second area of rough surface and a second area of smooth surface, and the second area of rough surface and the second area of smooth surface are arranged on the inner wall of the each flow channel at intervals.

Preferably, the heat-conducting mixture includes a mixture consisting of a matrix resin, carbon fiber, and heat-conducting powder.

Preferably, the single-cavity multi-runner also includes:

an pressing device, wherein the pressing device is connected to the first inlet and includes a casing, wherein an oil pressing cavity, and a material pressing cavity are arranged in the casing. The oil pressing cavity, and the material pressing cavity are separated by an pressing plate. The upper end of the casing is arranged with a feed inlet adjacent to the material pressing cavity. A first oil inlet hole and a feed outlet are connected outside the casing, the feed outlet is arranged adjacent to the material pressing cavity and is connected to the first inlet. The first oil inlet hole is arranged adjacent to the oil pressing cavity, and the first oil inlet hole is connected to an oil press device. The oil press device includes a first cylinder body, and the first cylinder body is connected to the side end of the casing. The inner wall of the upper end of the first cylinder body is connected to a first sleeve pipe, and the first sleeve pipe and the first cylinder body are coaxially arranged. The upper end of the first sleeve pipe is connected to the inner wall of the upper end of the first cylinder body, and the lower end of the first sleeve pipe is sealed with a mounting plate. The first sleeve pipe is internally connected to a plug body, the lower end of the plug body is rotationally connected to the upper end of the mounting plate, and the side end of the plug body is slidably connected to the inner wall of the first sleeve pipe. A plurality of oil inlet grooves are circumferentially distributed at the side end of the plug body, and the plurality of the oil inlet grooves are vertically distributed at equal intervals by taking the center axis of the plug body as a center. A plurality of first oil outlet holes matched with the oil inlet grooves are arranged at the position of the side end of the first sleeve pipe adjacent to the lower end, a plurality of second oil outlet holes matched with the oil inlet grooves are arranged on the mounting plate, and the first oil outlet holes and the second oil outlet holes are alternately distributed. A first rotating block is arranged at the upper end of the plug body, the side end of the first rotating block is slidably connected to the inner wall of the first sleeve pipe, and a rotating cavity is formed between the lower end of the first rotating block and the upper end of the plug body. The lower end of the first rotating block is vertically arranged with a rotating rod adjacent to the side end, and the farther end of the rotating rod from the first rotating block is connected to a sliding block. A column body is vertically arranged at the center of the upper end of the plug body, a sliding chute is arranged at the side end of the column body, the sliding chute is connected end to end in an annular shape, and the sliding block is slidably connected in the sliding chute. The upper end of the first cylinder body is connected to a rotating motor, the output end of the rotating motor is connected to a turntable, a rotating groove is arranged on the turntable, and the rotating groove is connected end to end into an elliptical shape. A driving rod is vertically arranged at the upper end of the first rotating block, the lower end of the driving rod is connected to the central position of the upper end of the first rotating block, and the upper end of the driving rod penetrates through the upper end of the first cylinder body. The upper end of the driving rod is connected to a second rotating block, and the second rotating block is slidably connected in the rotating groove. One end of a first oil inlet pipe is connected in the rotating cavity from the side end of the first cylinder body and the side end of the first sleeve pipe, the other end of the first oil inlet pipe is connected to the oil outlet end of an oil press machine, one end of a first oil outlet pipe penetrates through the side end of the first cylinder body adjacent to the upper end, the other end of the first oil outlet pipe is connected to the first oil inlet hole, and the lower end of the first cylinder body penetrates through and is connected to an oil drainpipe.

Preferably, the end in the inner wall of the first cylinder body is connected to a stopper adjacent to the first oil outlet pipe, the stopper includes a second pipe body, the upper end of the second pipe body is connected to the inner wall of the upper end of the first cylinder body, a columnar blocking block is slidably connected in the second pipe body, the upper end of the columnar blocking block is connected to an L-shaped rod, one end of the L-shaped rod penetrates through the upper end of the first cylinder body and is connected to the driving rod, and the farther end of the first oil outlet pipe from the first oil inlet hole penetrates through and is connected with the side end of the second pipe body.

Preferably, the side end of the casing is connected to an oil return pipe, one end of the oil return pipe is arranged adjacent to the oil pressing cavity, and the other end of the oil return pipe is connected to an oil storage tank.

Preferably, the oil inlet end of the oil press machine is connected to the oil storage tank through a pipeline.

Preferably, the side end of the casing is connected to an oil return device at a position adjacent to the feed outlet, the oil return device includes a second sleeve piece, the second sleeve piece is transversely connected to the side end of the casing, and an opening is formed at the end of the second sleeve piece adjacent to the casing. One end of a first driving rod penetrates through the side end of the casing adjacent to the feed outlet, and is connected to the end of the pressing plate adjacent to the material pressing cavity, and the other end of the first driving rod is connected to a driving block. The driving block is slidably connected to the inner wall of the second sleeve piece, the farther end of the second sleeve piece from the casing is respectively connected to a second oil outlet pipe and a second oil return pipe. The farther end of the second oil outlet pipe from the second sleeve piece is connected to the oil drainpipe, the farther end of the second oil return pipe from the second sleeve piece is connected to the oil storage tank, and the second oil return pipe is connected to an electric switch valve.

Preferably, the single-cavity multi-runner also includes a voltage regulator circuit connected to the input end of the rotating motor, and the voltage regulator circuit includes an M-type field effect transistor M111. A gate electrode of the M-type field effect transistor M111 is connected to the collector electrode of a triode Q112, the emitter electrode of the triode Q112 is connected to the emitter electrode of a triode Q111, and the base electrode of the triode Q111 is simultaneously connected to the base electrode of the triode Q112 and the collector electrode of the triode Q111. The collector electrode of the triode Q111 is connected to one end of a resistor R111, and the other end of the resistor R111 is grounded. The emitter electrode of the triode Q112 is used as the input end yin of a first voltage regulator circuit and is connected to the collector electrode of a triode Q115. The collector electrode of the triode Q112 is connected to one end of a resistor R112, and the other end of the resistor R112 is connected to one end of a charging capacitor C111. The charging capacitor C111 is connected in parallel with a resistor R117, and the other end of the charging capacitor C111 is grounded. The collector electrode of the triode Q112 is used as the output end Vout of the first voltage regulator circuit, a resistor R113 is connected between the collector electrode of the triode Q112 and the base electrode of a triode Q113. A resistor R114 is connected between the collector electrode of the triode Q113 and a power supply VCC, and the emitter electrode of the triode Q113 is grounded. A resistor R115 is connected between the collector electrode of the triode Q114 and one end of the charging capacitor C111, and the emitter electrode of the triode Q114 is grounded. The base electrode of the triode Q114 is connected to the collector electrode of the triode Q113, and a resistor R116 is connected between the emitter electrode and the base electrode of the triode Q115.

The source electrode of the M-type field effect transistor M111 is connected to the drain electrode of an M-type field effect transistor M112. The gate electrode of the M-type field effect transistor M112 is connected to the gate electrode and the drain electrode of an M-type field effect transistor M113. The drain electrode of the M-type field effect transistor M111 is connected to the drain electrode of a N-type field effect transistor N111, the gate electrode of the N-type field effect transistor N111 is connected to the gate electrode and the drain electrode of a N-type field effect transistor N114. The source electrode of the N-type field effect transistor N111 is connected to the drain electrode of a N-type field effect transistor N112, the gate electrode of the N-type field effect transistor N112 is connected to the gate electrode of a N-type field effect transistor N115, and the source electrode of the N-type field effect transistor N112 is grounded. The drain electrode of the N-type field effect transistor N111 is connected to the gate electrode of a N-type field effect transistor N113, and the drain electrode of the M-type field effect transistor M113 is connected to the drain electrode of the N-type field effect transistor N115. The drain electrode of the M-type field effect transistor M112 is connected to the drain electrode of the N-type field effect transistor N113, and the drain electrode of the M-type field effect transistor M112 is connected to the drain electrode of the N-type field effect transistor N114 and the emitter electrode of the triode Q115, respectively. The source electrode of the M-type field effect transistor M112 is connected to the source electrode of the M-type field effect transistor M113, and is connected to the power supply VCC. The source electrode of the N-type field effect transistor N113, the source electrode of the N-type field effect transistor N114, and the source electrode of the N-type field effect transistor N115 are all grounded.

BRIEF DESCRIPTION OF THE DRAWINGS

In order to further illustrate the specific embodiments of the present invention or demonstrate the technical solutions in the prior art, the drawings that need to be used in the specific embodiments or the description in the prior art will be briefly introduced. It will be apparent to those skilled in the art that the drawings in the following description are some embodiments of the present invention and that other drawings can be obtained from these drawings without any creative effort.

Figure 1:
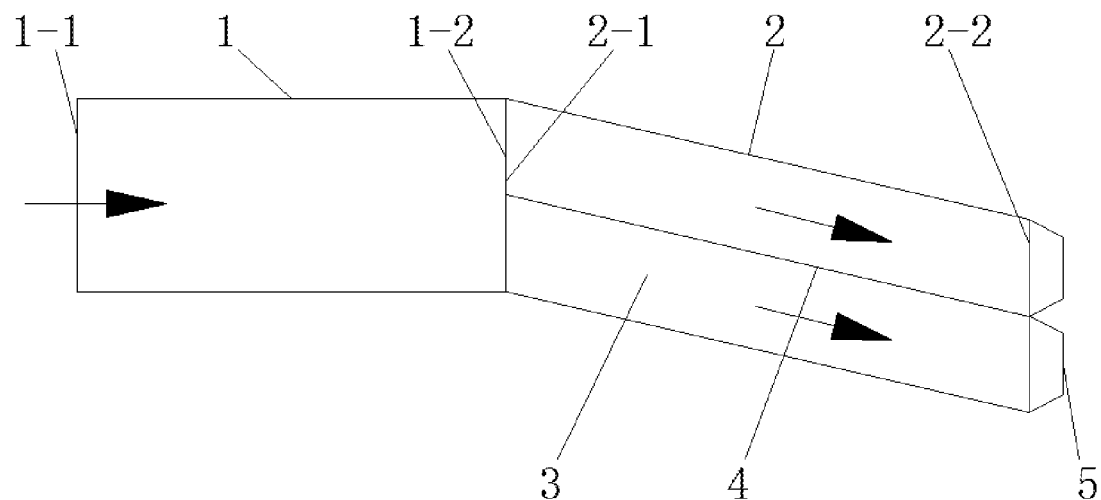
FIG. 1 is a structural diagram of the present invention.

In the drawings: 1. first extrusion cavity; 2. first molding cavity; 3. flow channel; 4. baffle plate; 5. second molding cavity; 6. pressing device; 7. oil press device; 9. stopper; 10. oil return device; 1-1. first inlet; 1-2. first outlet; 2-1. second inlet; 2-2. second outlet; 5-1. third inlet; 5-2. third outlet; 6-1. casing; 6-2. oil pressing cavity; 6-3. material pressing cavity; 6-4. pressing plate; 6-5. first oil inlet hole; 6-6. feed outlet; 6-7. feed inlet; 6-8. oil return pipe; 6-9. oil storage tank; 7-0. sliding chute; 7-1. first cylinder body; 7-2. first sleeve pipe; 7-3. mounting plate; 7-4. plug body; 7-5. oil inlet groove; 7-6. first rotating block; 7-7. rotating rod; 7-8. sliding block; 7-9. column body; 8-1. rotating motor; 8-2. turntable; 8-3. rotating groove; 8-4. driving rod; 8-5. second rotating block; 8-6. first oil inlet pipe; 8-7. first oil outlet pipe; 8-8. oil press machine; 8-9. oil drainpipe; 9-1. second pipe body; 9-2. columnar blocking block; 9-3. L-shaped rod; 10-1. second sleeve piece; 10-2. opening; 10-3. first driving rod; 10-4. driving block; 10-5. second oil outlet pipe; 10-6. second oil return pipe; 10-7. electric switch valve; 7-21. first oil outlet hole; 7-31. second oil outlet hole; 7-71. rotating cavity.

DETAILED DESCRIPTION OF THE EMBODIMENTS

The technical solutions of the present invention will be described clearly and completely in combination with the drawings. Obviously, the described embodiments are part of the embodiments of the present invention, rather than all. Based on the embodiments of the present invention, all other embodiments obtained by ordinary technical personnel in the art without making creative work shall be within the scope of the protection of the present invention.

Embodiments

The present invention will be further described in combination with the drawings.

As shown in FIG. 1, the present embodiment provides a single-cavity multi-runner applied to oriented arrangement extrusion molding equipment of graphene fibers, including:
the first extrusion cavity 1, wherein the first extrusion cavity 1 includes the first inlet 1-1 and the first outlet 1-2 arranged opposite to each other;
the first molding cavity 2, wherein the first molding cavity 2 is arranged in an inclined manner, the second inlet 2-1 is arranged at the high position end of the first molding cavity 2, the second outlet 2-2 is arranged at the low position end of the first molding cavity 2, and the second inlet 2-1 is connected to the first outlet 1-2;
a plurality of flow channels 3, wherein the plurality of flow channels 3 are formed by dividing the first molding cavity 2 using the baffle plates 4 arranged horizontally and along the flowing direction of a heat-conducting mixture;
the second molding cavity 5, wherein the second molding cavity 5 includes the third inlet 5-1 and the third outlet 5-2 arranged opposite to each other, the third inlet 5-1 is connected to the outflow end of the flow channels 3, and the inner wall of the second molding cavity 5 is contracted gradually from the third inlet 5-1 to the third outlet 5-2.

The working principle and advantages of the above-mentioned technical solution are as follows.

The heat-conducting mixture is pushed by the pressing device into the first extrusion cavity 1 through the first inlet 1-1. The heat-conducting mixture is subjected to a first extrusion in the first extrusion cavity 1 to form a primary extrusion body. High heat conductivity graphene fibers in the primary extrusion body are subjected to a first oriented arrangement along the length direction of the primary extrusion body, the primary extrusion body is discharged from the first outlet 1-2 and enters the first molding cavity 2 through the second inlet 2-1, and then the primary extrusion body is divided into a plurality of secondary extrusion bodies with the same quantity as the flow channels separated by the baffle plates 4. Under a constant extrusion pressure, the graphene fibers in the primary extrusion body are separated into the plurality of the secondary extrusion bodies, and the high heat conductivity graphene fibers in the secondary extrusion bodies are subjected to a second oriented arrangement along the length direction of the secondary extrusion bodies. The secondary extrusion bodies discharged from the flow channels 3 flow into the third inlet 5-1 from the outflow end of the flow channels 3, and the secondary extrusion bodies are limited by the contraction mode arrangement of the inner wall of the second molding cavity 5 to be subjected to a third extrusion in the thickness direction. The third extrusion body extends lengthwise and the extended third extrusion body is extruded from the third outlet 5-2. The high heat conductivity graphene fibers in the third extrusion body are subjected to a third oriented arrangement along the length direction of the third extrusion body. The oriented arrangement effect of the graphene fibers in the heat-conducting mixture is well improved, and the heat conductivity of the heat-conducting sheet is enhanced through the design of the single cavity with multiple flow channels.

TABLE 1

| Extrusion force | Number of flow channels Orientation ratio | | | |
|---|---|---|---|---|
| 10 MMa | 15%-20% | 20%-24% | 33%-40% | 51%-58% |
| 12 MMa | 18%-24% | 25%-31% | 35%-43% | 56%-63% |
| 14 MMa | 25%-30% | 32%-40% | 41%-55% | 65%-75% |
| 16 MMa | 32%-38% | 42%-51% | 54%-67% | 68%-79% |
| 18 MMa | 40%-44% | 46%-56% | 55%-69% | 71%-81% |
| 20 MMa | 45%-55% | 55%-68% | 64%-75% | 77%-85% |

Definition of orientation ratio: the sheet material is observed under an electron microscope, and the percentage of the ideal length of graphene fibers per unit area to the total number of graphene fibers of the sheet material is calculated. For example, the total number of graphene fibers per unit area of the sheet material is observed by the electron microscope under a certain multiple (2000 or 5000 times), and then the graphene fibers with a length greater than 70% of the lengths of total graphene fibers are screened out. The ratio of the number of the graphene fibers whose length is more than 70% of the lengths of the total graphene fibers to the total number of graphene fibers is calculated to obtain the orientation ratio. As shown in Table 1, under the same extrusion pressure of the pressing device, the more the number of flow channels, the higher the orientation ratio, the better the oriented arrangement between the heat-conducting graphene fibers and the sheet material, thus the better the heat conductivity of the heat-conducting sheet.

In one embodiment, the inner wall of the first extrusion cavity 1 is provided with a first area of rough surface and a first area of smooth surface, and the first area of smooth surface is arranged adjacent to the first inlet 1-1.

The advantages of the above-mentioned technical solution are as follows: when the extrusion pressure of the pressing device is constant, the primary extrusion body is formed in the first extrusion cavity 1, and when the primary extrusion body flows to the first area of rough surface, the flowing speed of the primary extrusion body decreases due to the increase of friction force, which reduces the disordered arrangement of graphene fibers in the primary extrusion body in the flowing direction, and improves the oriented arrangement effect of graphene fibers in the primary extrusion body.

In one embodiment, the inner wall of the flow channels 3 is provided with a second area of rough surface and a second area of smooth surface, and the second area of rough surface and the second area smooth surface are arranged on the inner wall of the flow channels 3 at intervals.

The advantages of the above-mentioned technical solution are as follows: when the secondary extrusion body flows to the second area of rough surface, the flowing speed of the secondary extrusion body decreases due to the increase of friction force, which reduces the disordered arrangement of graphene fibers in the secondary extrusion body in the flowing direction, and improves the orientated arrangement effect of graphene fibers in the secondary extrusion body.

In one embodiment, the heat-conducting mixture includes the mixture consisting of a matrix resin, carbon fiber, and heat-conducting powder.

Figure 2:
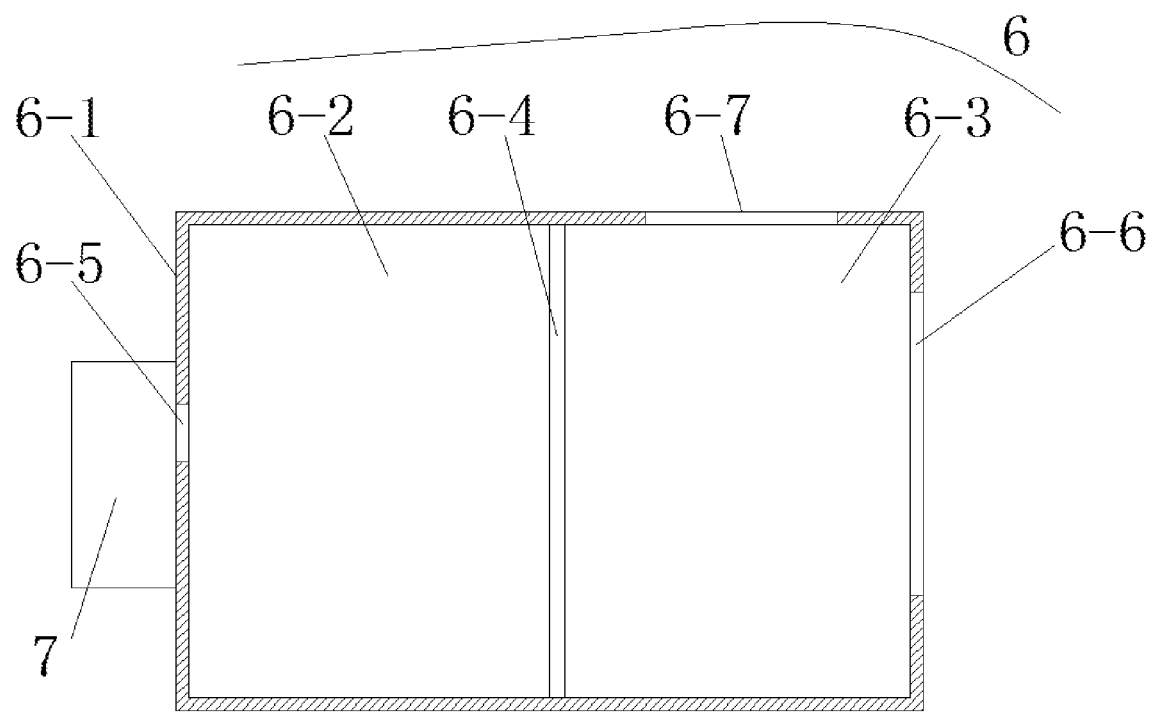
FIG. 2 is a structural diagram of the pressing device of the present invention.
Figure 3:
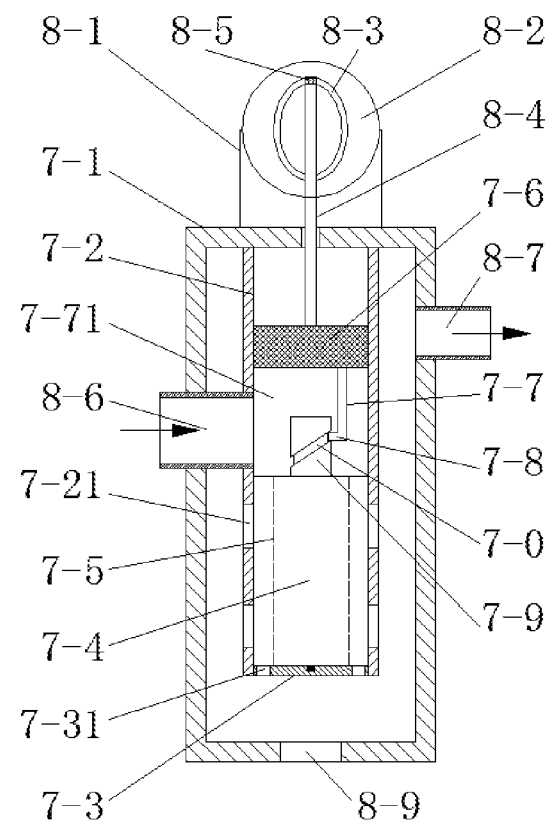
FIG. 3 is a first sectional view of the oil press device of the present invention.
Figure 4:
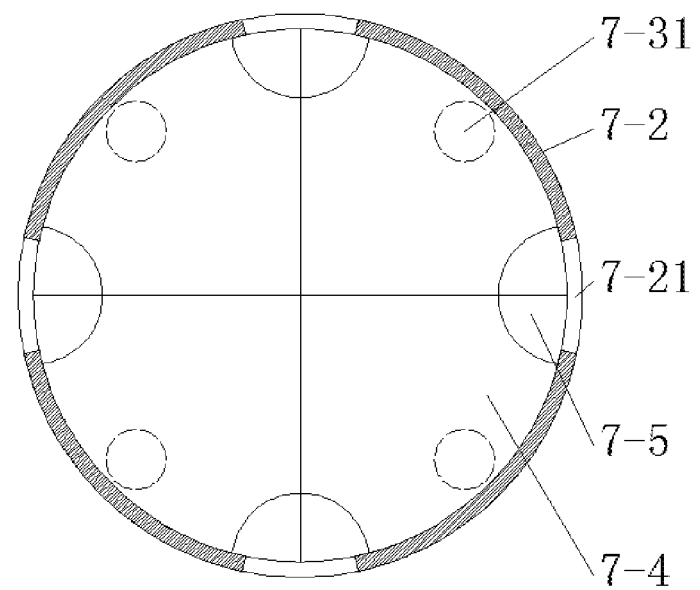
FIG. 4 is a top view of the plug body of the present invention.

As shown in FIGS. 2-4, in one embodiment, the present invention also includes:

the pressing device 6, wherein the pressing device 6 is connected to the first inlet 1-1, and the pressing device 6 includes the casing 6-1, wherein the oil pressing cavity, 6-2 and the material pressing cavity 6-3 are arranged in the casing 6-1. The oil pressing cavity, 6-2 and the material pressing cavity 6-3 are separated by the pressing plate 6-4. The upper end of the casing 6-1 is provided with the feed inlet 6-7 adjacent to the material pressing cavity 6-3. The first oil inlet hole 6-5 and the feed outlet 6-6 are connected outside the casing 6-1, the feed outlet 6-6 is arranged adjacent to the material pressing cavity 6-3 and is connected to the first inlet 1-1. The first oil inlet hole 6-5 is arranged adjacent to the oil pressing cavity, 6-2, and the first oil inlet hole 6-5 is connected to the oil press device 7. The oil press device 7 includes the first cylinder body 7-1, and the first cylinder body 7-1 is connected to the side end of the casing 6-1. The inner wall of the upper end of the first cylinder body 7-1 is connected to the first sleeve pipe 7-2, and the first sleeve pipe 7-2 and the first cylinder body 7-1 are coaxially arranged. The upper end of the first sleeve pipe 7-2 is connected to the inner wall of the upper end of the first cylinder body 7-1, and the lower end of the first sleeve pipe 7-2 is sealed with the mounting plate 7-3. The first sleeve pipe 7-2 is connected to the plug body 7-4, the lower end of the plug body 7-4 is rotationally connected to the upper end of the mounting plate 7-3, and the side end of the plug body 7-4 is slidably connected to the inner wall of the first sleeve pipe 7-2. The plurality of oil inlet grooves 7-5 are circumferentially distributed at the side end of the plug body 7-4, and the plurality of oil inlet grooves 7-5 are vertically distributed at equal intervals by taking the center axis of the plug body 7-4 as a center. The plurality of first oil outlet holes 7-21 matched with the oil inlet grooves 7-5 are arranged at the position of the side end of the first sleeve pipe 7-2 adjacent to the lower end, the plurality of second oil outlet holes 7-31 matched with the oil inlet grooves 7-5 are arranged on the mounting plate 7-3, and the first oil outlet holes 7-21 and the second oil outlet holes 7-31 are alternately distributed. The first rotating block 7-6 is arranged at the upper end of the plug body 7-4, the side end of the first rotating block 7-6 is slidably connected to the inner wall of the first sleeve pipe 7-2, and the rotating cavity 7-71 is formed between the lower end of the first rotating block 7-6 and the upper end of the plug body 7-4. The lower end of the first rotating block 7-6 is vertically provided with the rotating rod 7-7 adjacent to the side end, and the farther end of the rotating rod 7-7 from the first rotating block 7-6 is connected to the sliding block 7-8. The column body 7-9 is vertically arranged at the center of the upper end of the plug body 7-4, the sliding chute 7-0 is arranged at the side end of the column body 7-9, the sliding chute 7-0 is connected end to end in an annular shape, and the sliding block 7-8 is slidably connected in the sliding chute 7-0. The upper end of the first cylinder body 7-1 is connected to the rotating motor 8-1, the output end of the rotating motor 8-1 is connected to the turntable 8-2, the rotating groove 8-3 is arranged on the turntable 8-2, and the rotating groove 8-3 is connected end to end into an elliptical shape. The driving rod 8-4 is vertically arranged at the upper end of the first rotating block 7-6, the lower end of the driving rod 8-4 is connected to the central position of the upper end of the first rotating block 7-6, and the upper end of the driving rod 8-4 penetrates through the upper end of the first cylinder body 7-1. The upper end of the driving rod 8-4 is connected to the second rotating block 8-5, and the second rotating block 8-5 is slidably connected in the rotating groove 8-3. One end of the first oil inlet pipe 8-6 is connected in the rotating cavity 7-71 from the side end of the first cylinder body 7-1 and the side end of the first sleeve pipe 7-2, and the other end of the first oil inlet pipe 8-6 is connected to the oil outlet end of the oil press machine 8-8. One end of the first oil outlet pipe 8-7 penetrates through the side end of the first cylinder body 7-1 adjacent to the upper end, and the other end of the first oil outlet pipe 8-7 is connected to the first oil inlet hole 6-5. The lower end of the first cylinder body 7-1 penetrates through and is connected to the oil drainpipe 8-9.

The working principle and advantages of the above-mentioned technical solution are as follows: the heat-conducting mixture is placed in the material pressing cavity 6-3 from the feed inlet 6-7, and the feed inlet 6-7 is closed. At this time, the oil inlet grooves 7-5 are connected to the first oil outlet holes 7-21, and the oil press machine 8-8 makes the hydraulic oil pass through the first oil inlet pipe 8-6, the rotating cavity 7-71, the oil inlet grooves 7-5, the first oil outlet holes 7-21, the first oil outlet pipe 8-7, and the first oil inlet hole 6-5 successively, to enter into the oil pressing cavity, 6-2. The pressing plate 6-4 moves towards the material pressing cavity 6-3, and the heat-conducting mixture in the material pressing cavity 6-3 is extruded into the first extrusion cavity 1 from the feed outlet 6-6 and the first inlet 1-1. The extrusion pressure is related to the power of the oil press machine 8-8. After the extrusion in the material pressing cavity 6-3 is finished, the oil press machine 8-8 stops working, and the rotating motor 8-1 works and drives the turntable 8-2 connected to the output end of the rotating motor 8-1 to rotate. The second rotating block 8-5 slides in the rotating groove 8-3, and is connected to the upper end of the driving rod 8-4, and then the first rotating block 7-6, the rotating rod 7-7 and the sliding block 7-8 move up and down in the first sleeve pipe 7-2 driven by the driving rod 8-4. The sliding block 7-8 slides in the sliding chute 7-0, and is limited by the sliding chute 7-0 which is an annular chute connected end to end. The sliding block 7-8 is forced to slide towards the lower end of the sliding chute 7-0 to drive the column body 7-9 and the plug body 7-4 to rotate on the mounting plate 7-3. At this time, the oil inlet grooves 7-5 are connected to the second oil outlet holes 7-31, and the pressing plate 6-4 is manually pushed to move towards the oil pressing cavity, 6-2. The hydraulic oil in the oil pressing cavity, 6-2 reversely flows from the first oil outlet pipe 8-7 and the oil drainpipe 8-9.

Figure 5:
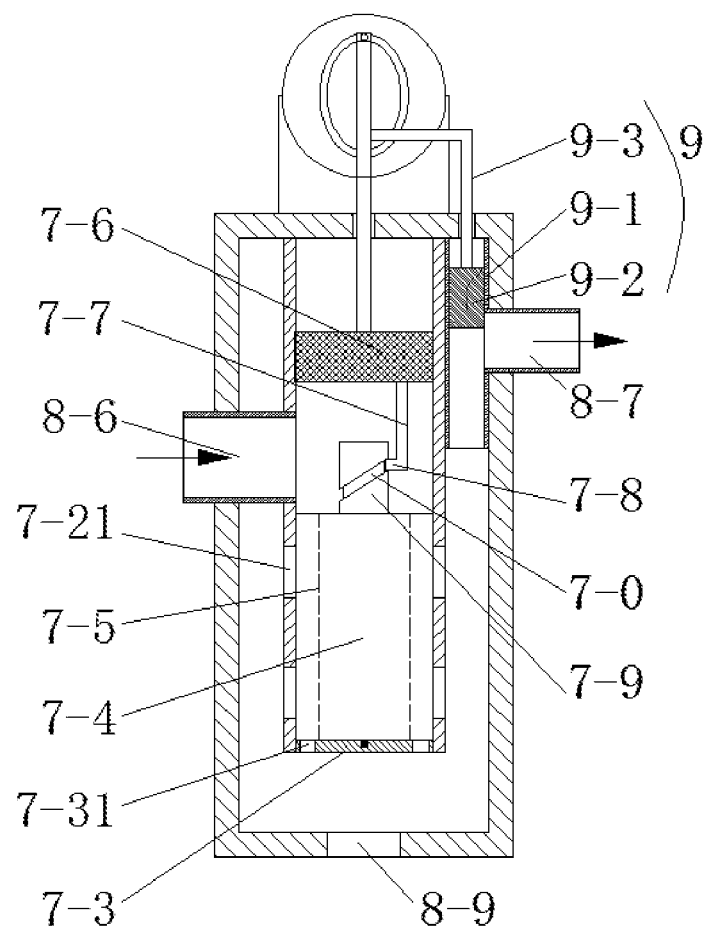
FIG. 5 is a second sectional view of the oil press device of the present invention.

As shown in FIG. 5, in one embodiment, the end in the inner wall of the first cylinder body 7-1 is connected to the stopper 9 adjacent to the first oil outlet pipe 8-7, the stopper 9 includes the second pipe body 9-1, the upper end of the second pipe body 9-1 is connected to the inner wall of the upper end of the first cylinder body 7-1, the columnar blocking block 9-2 is slidably connected in the second pipe body 9-1, the upper end of the columnar blocking block 9-2 is connected to the L-shaped rod 9-3, one end of the L-shaped rod 9-3 penetrates through the upper end of the first cylinder body 7-1 and is connected to the driving rod 8-4, and the farther end of the first oil outlet pipe 8-7 from the first oil inlet hole 6-5 penetrates through the side end of the second pipe body 9-1 and is connected in the second pipe body 9-1.

The working principle and advantages of the above-mentioned technical solution are as follows: when the first rotating block 7-6 descends, the L-shaped rod 9-3 connected to the driving rod 8-4 is driven to descend, and the L-shaped rod 9-3 drives the columnar blocking block 9-2 to descend in the second pipe body 9-1, and then the first oil outlet pipe 8-7 is blocked. At this time, the oil inlet grooves 7-5 and the second oil outlet holes 7-31 are connected, and the outer wall of the plug body 7-4 blocks the first oil outlet holes 7-21. The hydraulic oil enters from the first oil inlet pipe 8-6, passes through the rotating cavity 7-71, the oil inlet grooves 7-5, the second oil outlet holes 7-31, and discharged from the oil drainpipe 8-9. The pressing plate 6-4 is pushed manually, and the casing 6-1 is externally connected to a pipeline connected to the oil pressing cavity, 6-2 for oil drainage. The discharged hydraulic oil is collected into the oil storage device synchronously with the hydraulic oil discharged from the oil drainpipe 8-9, so as to circulate into the oil press machine 8-8.

Figure 6:
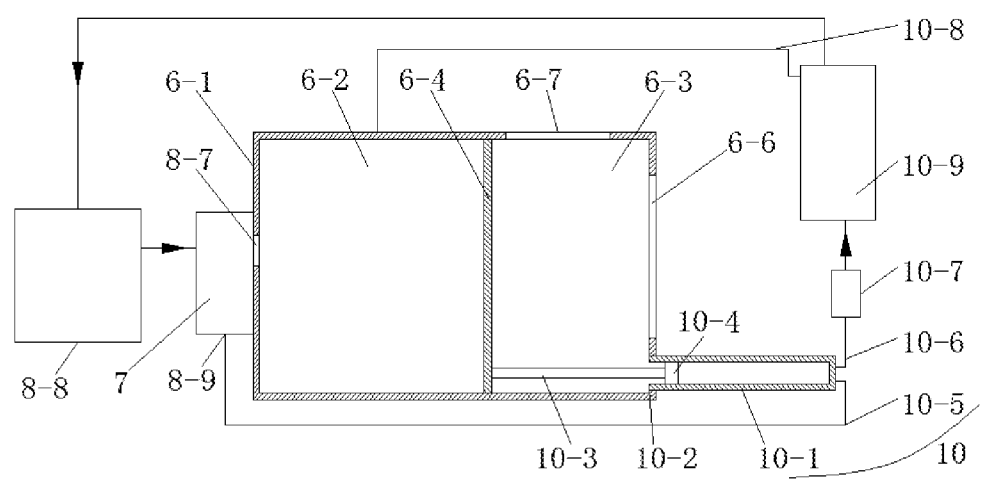
FIG. 6 is a block diagram of the connected components of the present invention.

As shown in FIG. 6, in one embodiment, the side end of the casing 6-1 is connected to the oil return pipe 6-8, one end of the oil return pipe 6-8 is arranged adjacent to the oil pressing cavity, 6-2, and the other end of the oil return pipe 6-8 is connected to the oil storage tank 6-9.

The advantage of the above-mentioned technical solution is to collect the hydraulic oil in the oil pressing cavity, 6-2.

In one embodiment, the oil inlet end of the oil press machine 8-8 is connected to the oil storage tank 6-9 through a pipeline.

The advantage of the above-mentioned technical solution is as follows: the hydraulic oil in the oil storage tank 6-9 flows back to the oil press machine 8-8 for recycling.

In one embodiment, the side end of the casing 6-1 is connected to the oil return device 10 at a position adjacent to the feed outlet 6-6, the oil return device 10 includes the second sleeve piece 10-1, the second sleeve piece 10-1 is transversely connected to the side end of the casing 6-1, and the opening 10-2 is formed at the end of the second sleeve piece 10-1 adjacent to the casing 6-1. One end of the first driving rod 10-3 penetrates through the side end of the casing 6-1 adjacent to the feed outlet 6-6, and is connected to the end of the pressing plate 6-4 adjacent to the material pressing cavity 6-3, and the other end of the first driving rod 10-3 is connected to the driving block 10-4. The driving block 10-4 is slidably connected to the inner wall of the second sleeve piece 10-1, the farther end of the second sleeve piece 10-1 from the casing 6-1 is respectively connected to the second oil outlet pipe 10-5 and the second oil return pipe 10-6. The farther end of the second oil outlet pipe 10-5 from the second sleeve piece 10-1 is connected to the oil drainpipe 8-9, the farther end of the second oil return pipe 10-6 from the second sleeve piece 10-1 is connected to the oil storage tank 6-9, and the second oil return pipe 10-6 is connected to the electric switch valve 10-7.

The working principle and advantages of the above-mentioned technical solution are as follows: when the first rotating block 7-6 descends, the plug body 7-4 rotates in the first sleeve pipe 7-2. At this time, the oil inlet grooves 7-5 and the second oil outlet holes 7-31 are connected, the outer wall of plug body 7-4 blocks the first oil outlet holes 7-21, and the columnar blocking block 9-2 drops to block the first oil outlet pipe 8-7. The hydraulic oil is successively passed through the first oil inlet pipe 8-6, the rotating cavity 7-71, the oil inlet grooves 7-5, the second oil outlet holes 7-31, the oil drainpipe 8-9, and the second oil outlet pipe 10-5 driven by the oil press machine 8-8, to enter into the second sleeve piece 10-1, so as to successively push the driving block 10-4, the first driving rod 10-3, and the pressing plate 6-4 to move towards the oil pressing cavity, 6-2. The oil return pipe 6-8 is opened, the hydraulic oil in the oil pressing cavity, 6-2 flows back to the oil storage tank 6-9. The material pressing cavity 6-3 is opened, and the heat-conducting mixture is placed in it. When an extrusion is performed, the oil return pipe 6-8 is closed, the second oil outlet pipe 10-5 is closed, the first rotating block 7-6 rises, and the plug body 7-4 rotates in the first sleeve pipe 7-2. At this time, the oil inlet grooves 7-5 and the first oil outlet holes 7-21 are connected, the columnar blocking block 9-2 rises, and the first oil outlet pipe 8-7 is opened. The hydraulic oil is successively passed through the first oil inlet pipe 8-6, the rotating cavity 7-71, the oil inlet grooves 7-5, the first oil outlet holes 7-21 and the first oil outlet pipe 8-7 driven by the oil press machine 8-8, to enter into the oil pressing cavity, 6-2. The pressing plate 6-4 moves towards the material pressing cavity 6-3, and the heat-conducting mixture is extruded from the feed outlet 6-6. At the same time, the electric switch valve 10-7 is opened, and the hydraulic oil in the second sleeve piece 10-1 is extruded into the oil storage tank 6-9 under the action of the driving block 10-4.

Figure 7:
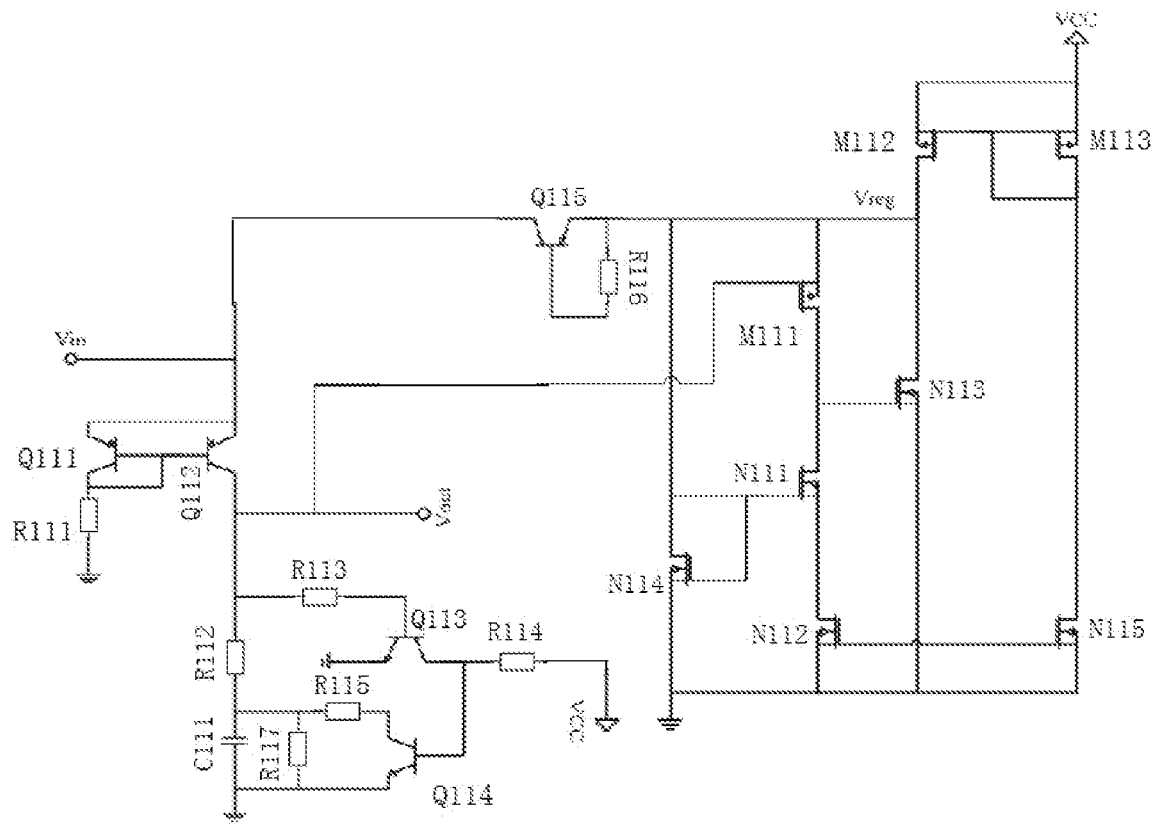
FIG. 7 is a circuit diagram of the present invention.

As shown in FIG. 7, in one embodiment, a voltage regulator circuit connected to the input end of the rotating motor 8-1 is also included, and the voltage regulator circuit includes the M-type field effect transistor M111. The gate electrode of the M-type field effect transistor M111 is connected to the collector electrode of the triode Q112, the emitter electrode of the triode Q112 is connected to the emitter electrode of the triode Q111, and the base electrode of the triode Q111 is simultaneously connected to the base electrode of the triode Q112 and the collector electrode of the triode Q111. The collector electrode of the triode Q111 is connected to one end of the resistor R111, and the other end of the resistor R111 is grounded. The emitter electrode of the triode Q112 is used as the input end yin of the first voltage regulator circuit and is connected to the collector electrode of the triode Q115. The collector electrode of the triode Q112 is connected to one end of the resistor R112, and the other end of the resistor R112 is connected to one end of the charging capacitor C111. The charging capacitor C111 is connected in parallel with the resistor R117, and the other end of the charging capacitor C111 is grounded. The collector electrode of the triode Q112 is used as the output end Vout of the first voltage regulator circuit, the resistor R113 is connected between the collector electrode of the triode Q112 and the base electrode of the triode Q113. The resistor R114 is connected between the collector electrode of the triode Q113 and the power supply VCC, and the emitter electrode of the triode Q113 is grounded. The resistor R115 is connected between the collector electrode of the triode Q114 and one end of the charging capacitor C111, and the emitter electrode of the triode Q114 is grounded. The base electrode of the triode Q114 is connected to the collector electrode of the triode Q113, and the resistor R116 is connected between the emitter electrode and the base electrode of the triode Q115.

The source electrode of the M-type field effect transistor M111 is connected to the drain electrode of the M-type field effect transistor M112. The gate electrode of the M-type field effect transistor M112 is connected to the gate electrode and the drain electrode of the M-type field effect transistor M113. The drain electrode of the M-type field effect transistor M111 is connected to the drain electrode of the N-type field effect transistor N111, the gate electrode of the N-type field effect transistor N111 is connected to the gate electrode and the drain electrode of the N-type field effect transistor N114. The source electrode of the N-type field effect transistor N111 is connected to the drain electrode of the N-type field effect transistor N112, the gate electrode of the N-type field effect transistor N112 is connected to the gate electrode of the N-type field effect transistor N115, and the source electrode of the N-type field effect transistor N112 is grounded. The drain electrode of the N-type field effect transistor N111 is connected to the gate electrode of the N-type field effect transistor N113, and the drain electrode of the M-type field effect transistor M113 is connected to the drain electrode of the N-type field effect transistor N115. The drain electrode of the M-type field effect transistor M112 is connected to the drain electrode of the N-type field effect transistor N113, and the drain electrode of the M-type field effect transistor M112 is connected to the drain electrode of the N-type field effect transistor N114 and the emitter electrode of the triode Q115, respectively. The source electrode of the M-type field effect transistor M112 is connected to the source electrode of the M-type field effect transistor M113 and is connected to the power supply VCC. The source electrode of the N-type field effect transistor N113, the source electrode of the N-type field effect transistor N114, and the source electrode of the N-type field effect transistor N115 are all grounded.

The advantages of the above-mentioned technical solution is to better stabilize the voltage at the input end of the rotating motor 8-1 by the voltage regulator circuit.

Obviously, the above-mentioned embodiments are merely examples for clear description, and are not intended to limit the implementation modes. On the basis of the above description, other different forms of changes or modifications may be made by ordinary technical personnel in the art. It is neither necessary nor possible to enumerate all the embodiments herein, and obvious variations or modifications thereof are still within the scope of the invention.

What is claimed is:

1. A single-cavity multi-runner applied to oriented arrangement extrusion molding equipment of graphene fibers, comprising:
   a first extrusion cavity, wherein the first extrusion cavity comprises a first inlet and a first outlet, and the first inlet and the first outlet are arranged opposite to each other;
   a first molding cavity, wherein the first molding cavity is arranged in an inclined manner, a second inlet is arranged at a first position end of the first molding cavity, a second outlet is arranged at a second position end of the first molding cavity, the first position end is higher than the second position end, and the second inlet is connected to the first outlet;
   a plurality of flow channels, wherein the plurality of flow channels are formed by dividing the first molding cavity using baffle plates, the baffle plates are arranged horizontally and the baffle plates are arranged along a flowing direction of a heat-conducting mixture; and
   a second molding cavity, wherein the second molding cavity comprises a third inlet and a third outlet, the third inlet and the third outlet are arranged opposite to each other, the third inlet is connected to an outflow end of the plurality of flow channels, and an inner wall of the second molding cavity is contracted gradually from the third inlet to the third outlet.

2. The single-cavity multi-runner according to claim 1, wherein an inner wall of the first extrusion cavity is provided with a first area of rough surface and a first area of smooth surface, and the first area of smooth surface is arranged adjacent to the first inlet.

3. The single-cavity multi-runner according to claim 1, wherein an inner wall of each flow channel of the plurality of flow channels is provided with a second area of rough surface and a second area of smooth surface, and the second area of rough surface and the second area of smooth surface are arranged on the inner wall of the each flow channels at intervals.

4. The single-cavity multi-runner according to claim 1, wherein the heat-conducting mixture comprises a mixture consisting of a matrix resin, carbon fiber, and heat-conducting powder.

5. The single-cavity multi-runner according to claim 1, further comprising:
   an pressing device, wherein the pressing device is connected to the first inlet and the pressing device comprises a casing, wherein an oil pressing cavity, and a material pressing cavity are arranged in the casing; the oil pressing cavity, and the material pressing cavity are separated by a pressing plate; an upper end of the casing is arranged with a feed inlet, and the feed inlet is adjacent to the material pressing cavity; a first oil inlet hole and a feed outlet are connected outside the casing, the feed outlet is arranged adjacent to the material pressing cavity and the feed outlet is connected to the first inlet; the first oil inlet hole is arranged adjacent to the oil pressing cavity, and the first oil inlet hole is connected to an oil press device; the oil press device comprises a first cylinder body, and the first cylinder body is connected to a side end of the casing; an inner wall of an upper end of the first cylinder body is connected to a first sleeve pipe, and the first sleeve pipe and the first cylinder body are coaxially arranged; an upper end of the first sleeve pipe is connected to the inner wall of the upper end of the first cylinder body, and a lower end of the first sleeve pipe is sealed with a mounting plate; a plug body is connected in the first sleeve pipe, a lower end of the plug body is rotationally connected to an upper end of the mounting plate, and a side end of the plug body is slidably connected to an inner wall of the first sleeve pipe; a plurality of oil inlet grooves are circumferentially distributed at the side end of the plug body, and the plurality of oil inlet grooves are vertically distributed at equal intervals by taking a center axis of the plug body as a center; a plurality of first oil outlet holes are matched with the plurality of oil inlet grooves, the plurality of first oil outlet holes are arranged at a position of a side end of the first sleeve pipe, and the position of the side end of the first sleeve pipe is adjacent to a lower end of the first sleeve pipe, a plurality of second oil outlet holes are matched with the plurality of oil inlet grooves, the plurality of second oil outlet holes are arranged on the mounting plate, and the plurality of first oil outlet holes and the plurality of second oil outlet holes are alternately distributed; a first rotating block is arranged at an upper end of the plug body, a side end of the first rotating block is slidably connected to the inner wall of the first sleeve pipe, and a rotating cavity is formed between a lower end of the first rotating block and the upper end of the plug body; the lower end of the first rotating block is vertically arranged with a rotating rod, the rotating rod is adjacent to the side end of the first rotating block, and a farther end of the rotating rod from the first rotating block is connected to a sliding block; a column body is vertically arranged at a center of the upper end of the plug body, a sliding chute is arranged at a side end of the column body, the sliding chute is connected end to end in an annular shape, and the sliding block is slidably connected in the sliding chute; the upper end of the first cylinder body is connected to a rotating motor, an output end of the rotating motor is connected to a turntable, a rotating groove is arranged on the turntable, and the rotating groove is connected end to end into an elliptical shape; a second driving rod is vertically arranged at an upper end of the first rotating block, a lower end of the second driving rod is connected to a central position of the upper end of the first rotating block, and an upper end of the second driving rod penetrates through the upper end of the first cylinder body; the upper end of the second driving rod is connected to a second rotating block, and the second rotating block is slidably connected in the rotating groove; a first end of a first oil inlet pipe is connected in the rotating cavity from a side end of the first cylinder body and the side end of the first sleeve pipe, a second end of the first oil inlet pipe is connected to an oil outlet end of an oil press machine, a first end of a first oil outlet pipe penetrates through the side end of the first cylinder body, the first end of the first oil outlet pipe is adjacent to the upper end of the first cylinder body, a second end of the first oil outlet pipe is connected to the first oil inlet hole, and a lower end of the first cylinder body penetrates through an oil drainpipe and the lower end of the first cylinder body is connected to the oil drainpipe.

6. The single-cavity multi-runner according to claim 5, wherein an end in an inner wall of the first cylinder body is connected to a stopper, the stopper is adjacent to the first oil outlet pipe, the stopper comprises a second pipe body, an upper end of the second pipe body is connected to the inner wall of the upper end of the first cylinder body, a columnar blocking block is slidably connected in the second pipe body, an upper end of the columnar blocking block is connected to a first end of an L-shaped rod, a second end of the L-shaped rod penetrates through the upper end of the first cylinder body and the second end of the L-shaped rod is connected to the second driving rod, and a farther end of the first oil outlet pipe from the first oil inlet hole penetrates through a side end of the second pipe body and the farther end of the first oil outlet pipe from the first oil inlet hole is connected in the second pipe body.

7. The single-cavity multi-runner according to claim 5, wherein the side end of the casing is connected to an oil return pipe, a first end of the oil return pipe is arranged adjacent to the oil pressing cavity, and a second end of the oil return pipe is connected to an oil storage tank.

8. The single-cavity multi-runner according to claim 5, wherein an oil inlet end of the oil press machine is connected to an oil storage tank through a pipeline.

9. The single-cavity multi-runner according to claim 5, wherein the side end of the casing is connected to an oil return device at a position, the position is adjacent to the feed outlet, the oil return device comprises a second sleeve piece, the second sleeve piece is transversely connected to the side end of the casing, and an opening is formed at an end of the second sleeve piece, the opening is adjacent to the casing, a first end of a first driving rod penetrates through the side end of the casing, the side end of the casing is adjacent to the feed outlet, and the first end of the first driving rod is connected to an end of the pressing plate, the end of the pressing plate is adjacent to the material pressing cavity, and a second end of the first driving rod is connected to a driving block; the driving block is slidably connected to an inner wall of the second sleeve piece, a farther end of the second sleeve piece from the casing is respectively connected to a second oil outlet pipe and a second oil return pipe; a farther end of the second oil outlet pipe from the second sleeve piece is connected to the oil drainpipe, a farther end of the second oil return pipe from the second sleeve piece is connected to an oil storage tank, and the second oil return pipe is connected to an electric switch valve.

10. The single-cavity multi-runner according to claim 5, further comprising a voltage regulator circuit, wherein the voltage regulator circuit is connected to an input end of the rotating motor, wherein the voltage regulator circuit comprises first M-type field effect transistor; a gate electrode of the first M-type field effect transistor is connected to a collector electrode of a first triode, an emitter electrode of the first triode is connected to an emitter electrode of a second triode, and a base electrode of the second triode is simultaneously connected to a base electrode of the first triode and a collector electrode of the second triode; the collector electrode of the second triode is connected to a first end of a first resistor, and a second end of the first resistor is grounded; the emitter electrode of the first triode is used as an input end of the voltage regulator circuit and the emitter electrode of the first triode is connected to a collector electrode of a third triode; the collector electrode of the first triode is connected to a first end of a second resistor, and a second end of the second resistor is connected to a first end of a charging capacitor; the charging capacitor is connected in parallel with a third resistor, and a second end of the charging capacitor is grounded; the collector electrode of the first triode is used as an output end of the voltage regulator circuit, a fourth resistor is connected between the collector electrode of the first triode and a base electrode of a fourth triode; a fifth resistor is connected between a collector electrode of the fourth triode and a power supply, and an emitter electrode of the fourth triode is grounded; a sixth resistor is connected between a collector electrode of a fifth triode and the first end of the charging capacitor, and an emitter electrode of the fifth triode is grounded; a base electrode of the fifth triode is connected to the collector electrode of the fourth triode, and a seventh resistor is connected between an emitter electrode of the third triode and a base electrode of the third triode;

a source electrode of the first M-type field effect transistor is connected to a drain electrode of a second M-type field effect transistor; a gate electrode of the second M-type field effect transistor is connected to a gate electrode of a third M-type field effect transistor and a drain electrode of the third M-type field effect transistor; a drain electrode of the first M-type field effect transistor is connected to a drain electrode of a first N-type field effect transistor, a gate electrode of the first N-type field effect transistor is connected to a gate electrode of a second N-type field effect transistor and a drain electrode of the second N-type field effect transistor; a source electrode of the first N-type field effect transistor is connected to a drain electrode of a third N-type field effect transistor, a gate electrode of the third N-type field effect transistor is connected to a gate electrode of a fourth N-type field effect transistor, and a source electrode of the third N-type field effect transistor is grounded; the drain electrode of the first N-type field effect transistor is connected to a gate electrode of a fifth N-type field effect transistor, and the drain electrode of the third M-type field effect transistor is connected to a drain electrode of the fourth N-type field effect transistor; the drain electrode of the second M-type field effect transistor is connected to a drain electrode of the fifth N-type field effect transistor, and the drain electrode of the second M-type field effect transistor is connected to the drain electrode of the second N-type field effect transistor and the emitter electrode of the third triode, respectively; a source electrode of the second M-type field effect transistor is connected to a source electrode of the third M-type field effect transistor and the source electrode of the second M-type field effect transistor is connected to the power supply; a source electrode of the fifth N-type field effect transistor, a source electrode of the second N-type field effect transistor, and a source electrode of the fourth N-type field effect transistor are all grounded.

* * * * *